(12) United States Patent
Okamura et al.

(10) Patent No.: US 11,055,599 B2
(45) Date of Patent: Jul. 6, 2021

(54) WORKING DEVICE, WORKING VEHICLE, WORKING MACHINE, AND MANAGEMENT SYSTEM

(71) Applicant: KUBOTA CORPORATION, Osaka (JP)

(72) Inventors: Seiichi Okamura, Osaka (JP); Kanta Takechi, Osaka (JP); Daisuke Naito, Osaka (JP)

(73) Assignee: KUBOTA CORPORATION, Osaka (JP)

(*) Notice: Subject to any disclaimer, the term of this patent is extended or adjusted under 35 U.S.C. 154(b) by 20 days.

(21) Appl. No.: 16/231,785

(22) Filed: Dec. 24, 2018

(65) Prior Publication Data

US 2019/0147315 A1 May 16, 2019

Related U.S. Application Data

(63) Continuation of application No. PCT/JP2017/036726, filed on Oct. 11, 2017.

(30) Foreign Application Priority Data

Oct. 12, 2016 (JP) .............................. JP2016-201261
Oct. 12, 2016 (JP) .............................. JP2016-201262

(51) Int. Cl.
G06K 19/08 (2006.01)
G06K 19/10 (2006.01)
G06K 19/077 (2006.01)
A01B 63/02 (2006.01)
G06Q 30/00 (2012.01)
(Continued)

(52) U.S. Cl.
CPC .............. *G06K 19/08* (2013.01); *A01B 63/02* (2013.01); *G06K 19/06046* (2013.01); *G06K 19/077* (2013.01); *G06K 19/0723* (2013.01);

*G06K 19/0776* (2013.01); *G06K 19/083* (2013.01); *G06K 19/10* (2013.01); *G06Q 30/01* (2013.01);
(Continued)

(58) Field of Classification Search
CPC .................................................. G06Q 30/0258
See application file for complete search history.

(56) References Cited

U.S. PATENT DOCUMENTS 5,905,433 A    5/1999  Wortham
9,165,127 B2 * 10/2015  Miura ...................... B66C 1/00
(Continued)

FOREIGN PATENT DOCUMENTS

CN    1130978    9/1996
CN    1817080    8/2006
(Continued)

OTHER PUBLICATIONS

Search Report dated Jun. 15, 2020 in EP Application No. 17861132.3.

*Primary Examiner* — Christle I Marshall
(74) *Attorney, Agent, or Firm* — Greenblum & Bernstein, P.L.C.

(57) ABSTRACT

A working device includes: a working portion configured to perform work; a frame supporting the working portion and being configured to be coupled to a vehicle body; and a wireless tag attached to the working portion or to the frame, having: a storage part configured to store at least identifying information; and a communication part configured to transmit the identifying information.

9 Claims, 20 Drawing Sheets

(51) Int. Cl.
*G06Q 30/02* (2012.01)
*G06K 19/07* (2006.01)
*G06K 19/06* (2006.01)
*A01B 76/00* (2006.01)

(52) U.S. Cl.
CPC ....... *G06Q 30/012* (2013.01); *G06Q 30/0258* (2013.01); *A01B 76/00* (2013.01)

(56) References Cited

U.S. PATENT DOCUMENTS

| | | | |
|---|---|---|---|
| 10,430,754 B2 * | 10/2019 | Amann | H04B 17/23 |
| 2003/0182144 A1 | 9/2003 | Pickett et al. | |
| 2012/0089304 A1 | 4/2012 | Hamilton et al. | |
| 2013/0325288 A1 * | 12/2013 | Komine | G07C 5/008 |
| | | | 701/101 |
| 2014/0288823 A1 * | 9/2014 | Wilson | G07C 5/008 |
| | | | 701/468 |
| 2015/0373545 A1 * | 12/2015 | Miura | B66C 17/18 |
| | | | 726/7 |
| 2016/0091002 A1 * | 3/2016 | Miura | E02F 9/265 |
| | | | 60/459 |
| 2017/0041452 A1 * | 2/2017 | Amann | H04B 17/23 |
| 2017/0372534 A1 * | 12/2017 | Steketee | G07C 5/008 |
| 2019/0284784 A1 * | 9/2019 | Darlington | G07C 3/08 |

FOREIGN PATENT DOCUMENTS

| | | |
|---|---|---|
| CN | 104573759 | 4/2015 |
| CN | 104904359 | 9/2015 |
| DE | 2 018 981 | 1/2009 |
| DE | 102011120884 | 6/2013 |
| EP | 2 712 493 | 4/2014 |
| JP | H0549306 | 3/1993 |
| JP | 2003116304 | 4/2003 |
| JP | 2004024052 | 1/2004 |
| JP | 2006296261 | 11/2006 |
| JP | 2006296262 | 11/2006 |
| JP | 2006304737 | 11/2006 |
| JP | 2013066424 | 4/2013 |

* cited by examiner

FIG.9A

| Working results | | |
|---|---|---|
| Identifying Info. | Position info. | |
| | Latitude | Longitude |
| K-1150 | 34.558877 | 135.471009 |
| K-1150 | 34.558879 | 136.471009 |
| K-1150 | 36.558881 | 137.471009 |
| ⋮ | ⋮ | ⋮ |

FIG.9B

| | Working results | | | | |
|---|---|---|---|---|---|
| Identifying Info. | Operation info. | | | Position info. | |
| | Engine rev. speed(rpm) | Speed(km/h) | PTO rev. speed (rpm) | Latitude | Longitude |
| K-1150 | 1900 | 1.35 | 950 | 34.558877 | 135.471009 |
| K-1150 | 1920 | 1.36 | 970 | 34.558879 | 136.471009 |
| K-1150 | 1910 | 1.34 | 960 | 36.558881 | 137.471009 |
| . | . | . | . | . | . |
| . | . | . | . | . | . |
| . | . | . | . | . | . |

WORKING DEVICE, WORKING VEHICLE, WORKING MACHINE, AND MANAGEMENT SYSTEM

CROSS-REFERENCE TO RELATED APPLICATIONS

The present application is a continuation application of International Application No. PCT/JP 2017/036726, filed Oct. 11, 2017, which claims priority to Japanese Patent Application No. 2016/201262, filed Oct. 12, 2016 and to Japanese Patent Application No. 2016/201261, filed Oct. 12, 2016. The contents of these applications are incorporated herein by reference in their entirety.

BACKGROUND OF THE INVENTION

Field of the Invention

The present invention relates to a working device, a working vehicle, and a working machine having the working device and the working vehicle.

Description of Related Art

Conventionally, the technique disclosed in Japanese Unexamined Patent Application Publication No. 2004-024052 is known as a work device (an instrument) such as a tilling device connected to the rear portion of a tractor. The tractor disclosed in Japanese Unexamined Patent Application Publication No. 2004-024052 includes a link mechanism (three-point link mechanism) provided at a rear portion of a vehicle body and a tilling device detachable via a link mechanism.

SUMMARY OF THE INVENTION

A working device includes: a working portion configured to perform work; a frame supporting the working portion and being configured to be coupled to a vehicle body; and a wireless tag attached to the working portion or to the frame, having: a storage part configured to store at least identifying information; and a communication part configured to transmit the identifying information.

A working vehicle includes: a vehicle body; a coupling portion disposed on the vehicle body and configured to be coupled to a working device; and a wireless tag reader configured to receive identifying information of the working device and attached to the vehicle body or to the coupling portion.

A working machine, includes a working vehicle having: a vehicle body; a coupling portion disposed on the vehicle body; and a wireless tag reader attached to the vehicle body or the coupling portion and configured to receive identifying information; and a working device having: a working portion configured to perform work; a frame supporting the working portion and being coupled to the coupling portion; and a wireless tag attached to the working portion or to the frame and configured to transmit the identifying information.

A management system for a working device includes: a wireless tag attached to the working device, having a communicating part to transmit at least identifying information; a code providing part providing the identifying information of the wireless tag with use of a graphic; a reading part configured to read the graphic of the code providing part; a registration part configured to decode, into the identifying information, the graphic read by the reading part, to relate the decoded identifying information to the working device, and to register the decoded identifying information and the working device.

A management system for a working device, includes: a wireless tag attached to the working device, having a communicating part to transmit at least identifying information; a code providing part providing the identifying information of the wireless tag with use of a graphic; a mobile terminal having: a reading part configured to read the graphic of the code providing part; a registration part configured to decode, into the identifying information, the graphic read by the reading part, to relate the decoded identifying information to the working device, and to register the decoded identifying information and the working device.

A management system for a working device, includes: a wireless tag attached to the working device, having a communicating part to transmit at least identifying information; a code providing part providing the identifying information of the wireless tag with use of a graphic; a mobile terminal having: a reading part configured to read the graphic of the code providing part; a decoding part configured to decode, into the identifying information, the graphic read by the reading part; and a communication part configured to transmit the decoded identifying information; and a server having: an obtaining part configured to obtain the identifying information transmitted from the mobile terminal; and a registration part configured to relate the identifying information received by the obtaining part to the working device, and to register the identifying information and the working device.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9A is a view illustrating a case where identifying information and positional information are stored as working results according to the first embodiment;

FIG. 9B is a view illustrating a case where operational information, the identifying information and the positional information are stored as the working results according to the first embodiment;

DESCRIPTION OF THE EMBODIMENTS

Figure 1:
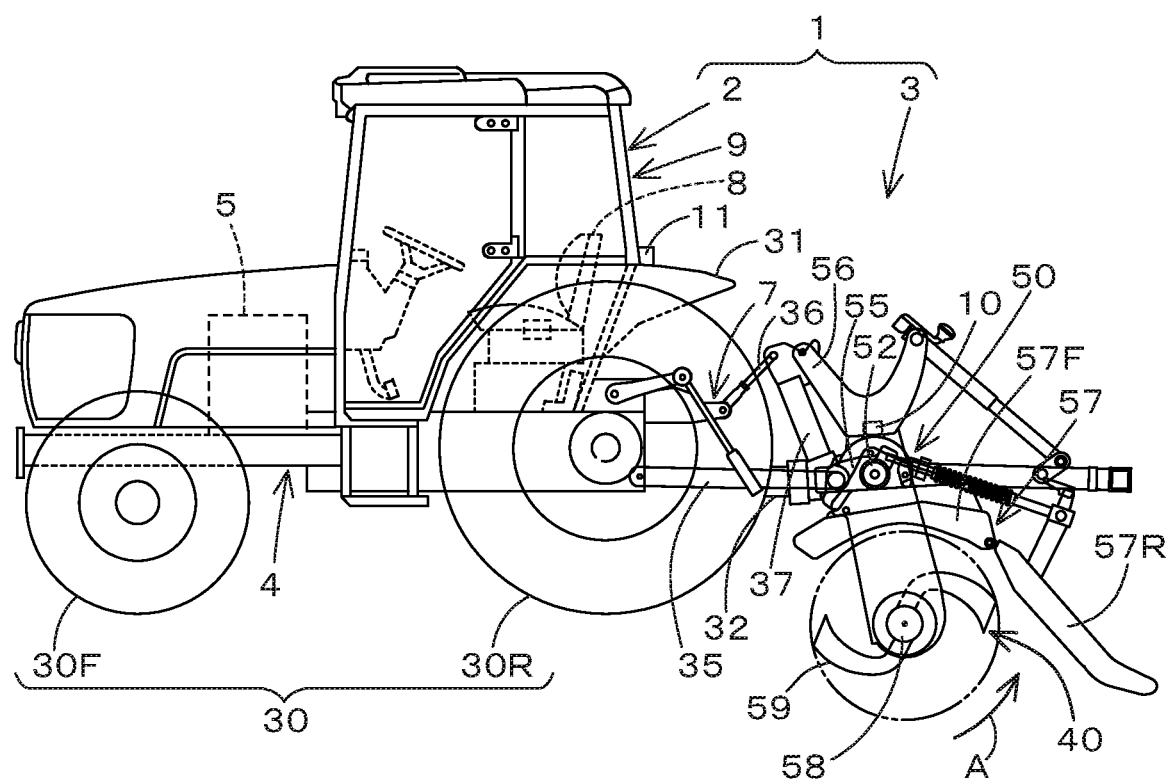
FIG. 1 is a view illustrating a whole view of a working machine in which a working device is coupled to a working vehicle according to a first embodiment of the present embodiment.

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, embodiments of the present invention will be described with reference to the drawings.

First Embodiment

The working machine will be described.

FIG. 1 shows an overall view of the working machine 1. The work machine 1 includes a working vehicle 2 and a working device 3. For convenience of explanation, it is assumed that the front side (the left side in FIG. 1) of the operator seated in the operator seat 8 provided in the working vehicle 2 is the front, the rear side (the right side in FIG. 1) of the operator is the rear, the left side (the front surface side in FIG. 1) of the operator is the left, and the right side (the back surface side in FIG. 1) of the operator is the right.

The working vehicle 2 is a tractor capable of pulling the working device 3. The working vehicle 2 includes a vehicle body 4 and a traveling device 30 mounted on the vehicle body 4. The vehicle body 4 is constituted of directly connecting a prime mover 5, a clutch housing having a clutch, a transmission case having a transmission device, a differential case having a differential device, and the like.

The prime mover 5 may be an engine, a motor, or both a motor and an engine. The traveling device 30 is a wheel type running device 30 having a front wheel 30F rotatably supported on the axle of the front portion of the vehicle body 4 and a rear wheel 30R rotatably supported on the axle of the rear portion of the vehicle body 4.

The upper portion of the rear wheel 30R is covered with a fender 31 provided at the rear portion of the vehicle body 4. Note that the traveling device 30 may be a crawler type traveling device.

The vehicle body 4 is provided with an operator seat 8. A steering wheel or the like for operating the traveling device 30 is provided in front of the operator seat 8. The vehicle body 4 may be provided with a cabin 9 surrounding the operator seat 8. A PTO shaft 32 that is rotated by the power of the prime mover 5 and the like projects from the rear portion of the vehicle body 4 and is capable of transmitting the rotational driving force of the PTO shaft 32 to the working device 3.

The vehicle body 4 is provided with a connecting portion 7 for connecting the working device 3. The connecting portion 7 is, for example, a three-point link mechanism provided at the rear portion of the vehicle body 4. The connecting portion 7 includes a pair of lower links 35 provided at the rear portion of the vehicle body 4, a top link 36 provided at the upper portion of the lower link 35 at the rear portion of the vehicle body 4, a lower link 35 and a top link 36 and has a connecting frame 37.

The front end of the lower link 35 is rotatably provided at the rear portion of the vehicle body 4. The rear end of the lower link 35 is rotatably provided on the connecting frame 37. The front end of the top link 36 is provided at the rear portion of the vehicle body 4 so as to be rotatable on the upper portion of the lower link 35. The rear end of the top link 36 is rotatably provided on the connecting frame 37. Further, the frame 50 of the working device 3 is detachably connected to the connecting frame 37.

In this embodiment, the connecting portion 7 is constituted of a three-point link mechanism, but it may be constituted of a two-point link mechanism or another mechanism, and is not limited thereto. In the embodiment described above, the frame 50 of the working device 3 is connected to the connecting frame 37. However, the other ends of the lower link 35 and the top link 36 may be connected to the frame 50 of the working device 3.

The working device 3 includes a working portion 40 for performing working and a frame 50 for supporting the working portion 40. The frame 50 is connected to the vehicle body 4 via the connecting portion 7. The working device 3 is, for example, a tilling device which cultivates.

For the sake of convenience of explanation, the working device 3 will be described by taking a tilling device as an example. As a matter of course, the working device 3 is connected to the working vehicle 2 such as a device other than a tilling device, a fertilizer spraying device for spraying fertilizer, an agricultural chemical spraying device for spraying agricultural chemicals, a harvesting device for harvesting, a ridging device, and the like. Any device may be used as long as it operates.

Figure 2:
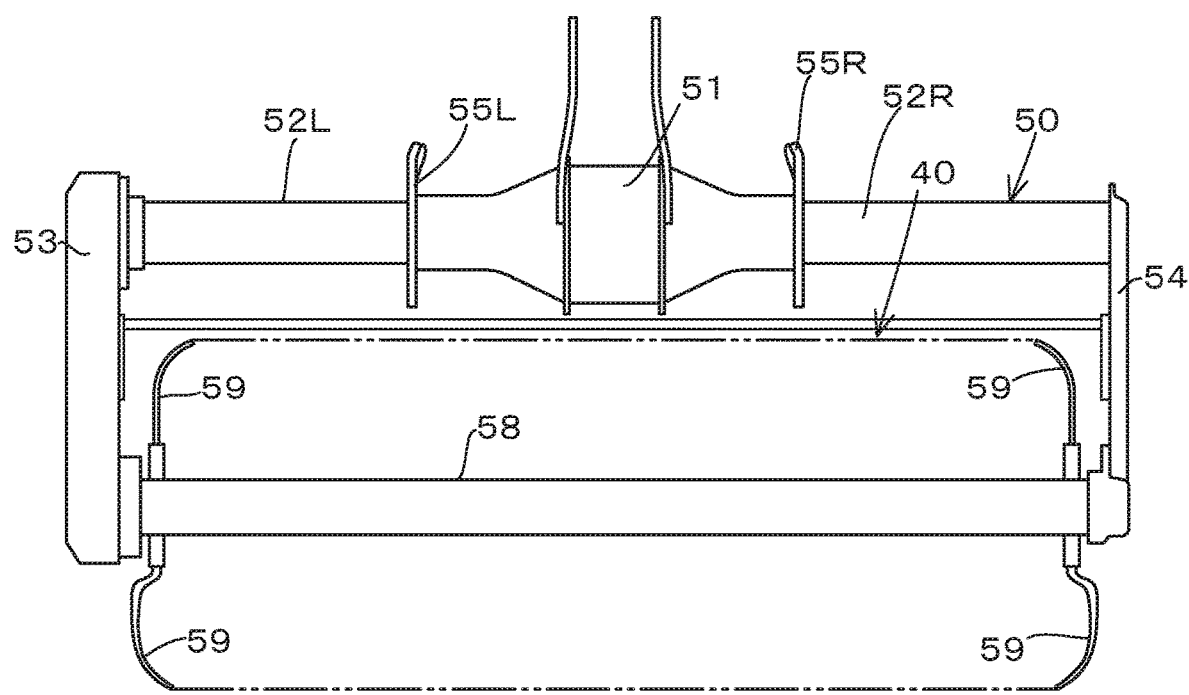
FIG. 2 is a first explanation view illustrating the working device according to the first embodiment.
Figure 3:
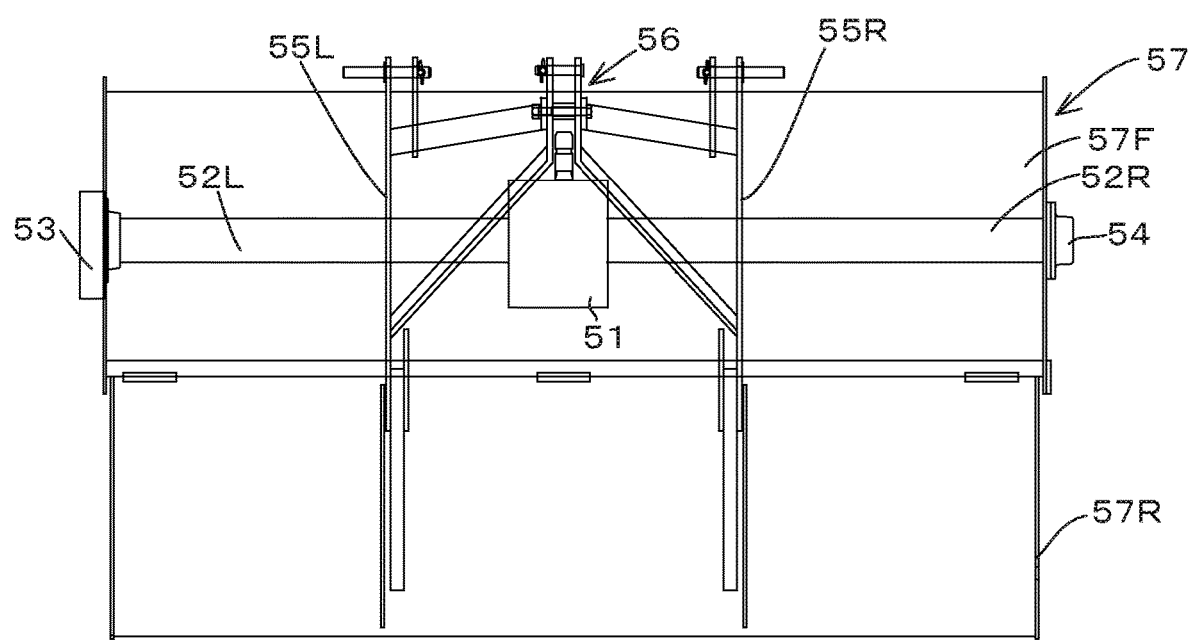
FIG. 3 is a second explanation view illustrating the working device according to the first embodiment.

As shown in FIG. 2 and FIG. 3, the frame 50 includes a gear case 51, a left support arm 52L, a right support arm 52R, a transmission case 53, and a side frame 54. The gear case 51 is located substantially at the center in the width direction of the working device 3.

The support arm 52L protrudes leftward from the left part of the gear case 51. The support arm 52R protrudes rightward from the right part of the gear case 51. The upper portion of the transmission case 53 is attached to the left end portion of the support arm 52L. The upper portion of the side frame 54 is attached to the right end portion of the support arm 52R.

Further, the frame 50 has a left support stay 55L, a right support stay 55R, and a mast 56. The support stay 55L is fixed to the support arm 52L. The support stay 55R is fixed to the support arm 52R. The mast 56 is fixed to the gear case 51. The front portion of the mast 56 is connected to the connecting frame 37.

Further, the frame 50 has a cover 57 covering the working portion 40. The cover 57 includes an upper cover 57L covering the upper side of the working portion 40 and a rear cover 57R covering the rear side of the working portion 40.

The working portion 40 has a rotating shaft 58 rotatably supported between the transmission case 53 and the side frame 54, and a tilling claw 59 provided on the rotating shaft 58. The rotating shaft 58 rotates by the power of the PTO shaft 32 on the work vehicle side.

More specifically, the gear case 51 is provided with an intake shaft, and the power of the PTO shaft 32 is transmitted to the intake shaft via the joint. The power transmitted to the intake shaft is transmitted to the chain transmission means in the transmission case 53 via the gear mechanism in the gear case 51 and the shaft in the support arm.

The rotary shaft 58 is driven by the power transmitted to the chain transmission means. The rotating shaft 58 is rotated in the direction indicated by the arrowed line A1 in FIG. 1. When the rotating shaft 58 rotates in the A1 direction, the tilling claw 59 plows the soil and releases it to the rear portion.

Figure 6:
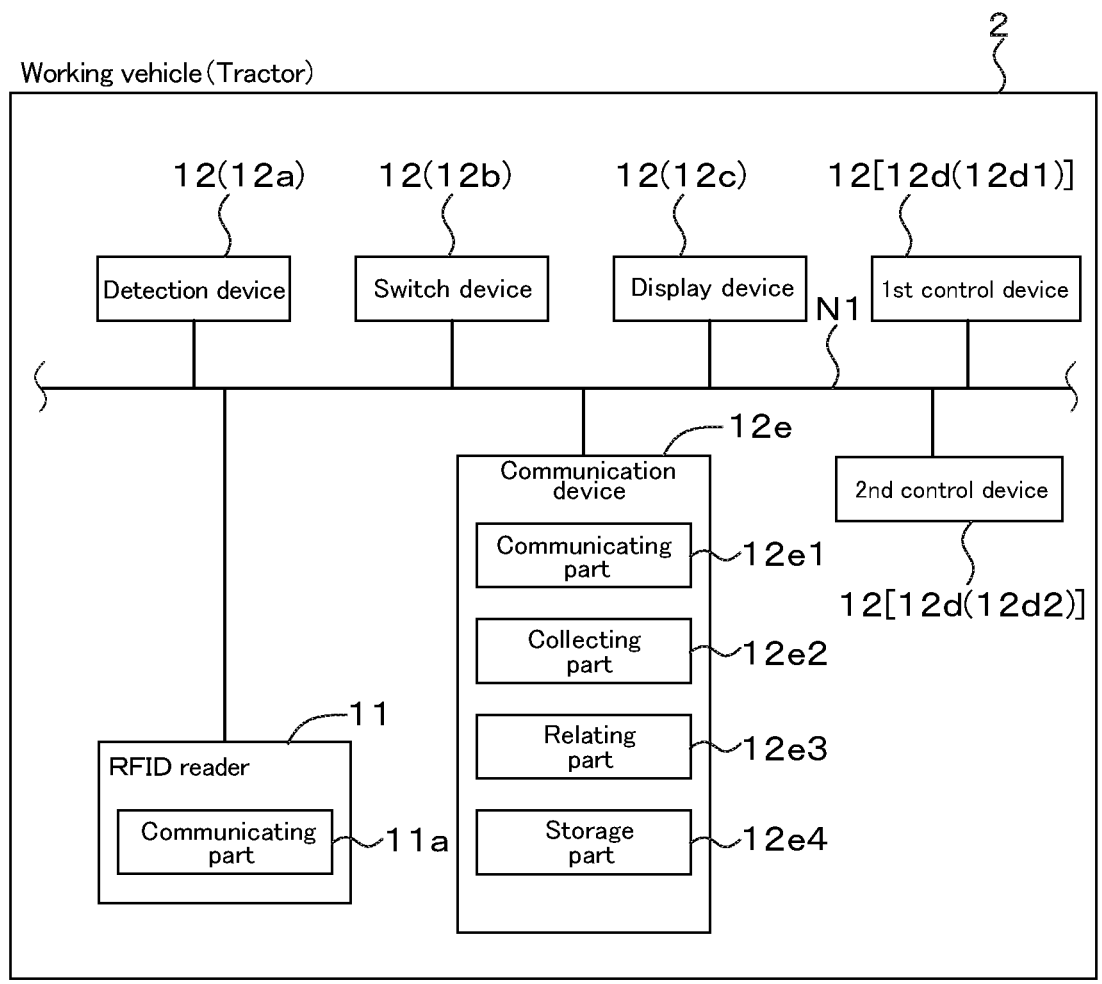
FIG. 6 is a view illustrating a management system of the working device according to the first embodiment.

As shown in FIG. 6, the working device 3 is provided with a wireless tag, that is, an RFID tag (Radio Frequency Identification) 10. The RFID tag 10 is a passive type RFID tag and is a tag that transmits identifying information of at least the working device 3.

The identifying information is information for specifying, that is, identifying the working device 3. The identifying information may be any information as long as it is information for identifying the working device 3, it may be a unique number (serial number) individually assigned to each of the working devices 3, a type of the working device 3, a model number, or information including a type.

Further, the working vehicle 2 is provided with a wireless tag reader that receives the identifying information of the RFID tag 10, that is, the RFID reader 11. The direction (transmission direction) of the radio wave (signal) transmitted from the RFID reader 11 is directed to the working device 3, the RFID tag 10 receives the radio wave transmitted from the RFID reader 11 and transmits the identifying information to the RFID reader 11 to be transmitted.

The mounting position in the horizontal direction of the RFID tag 10 will be described.

Figure 4A:
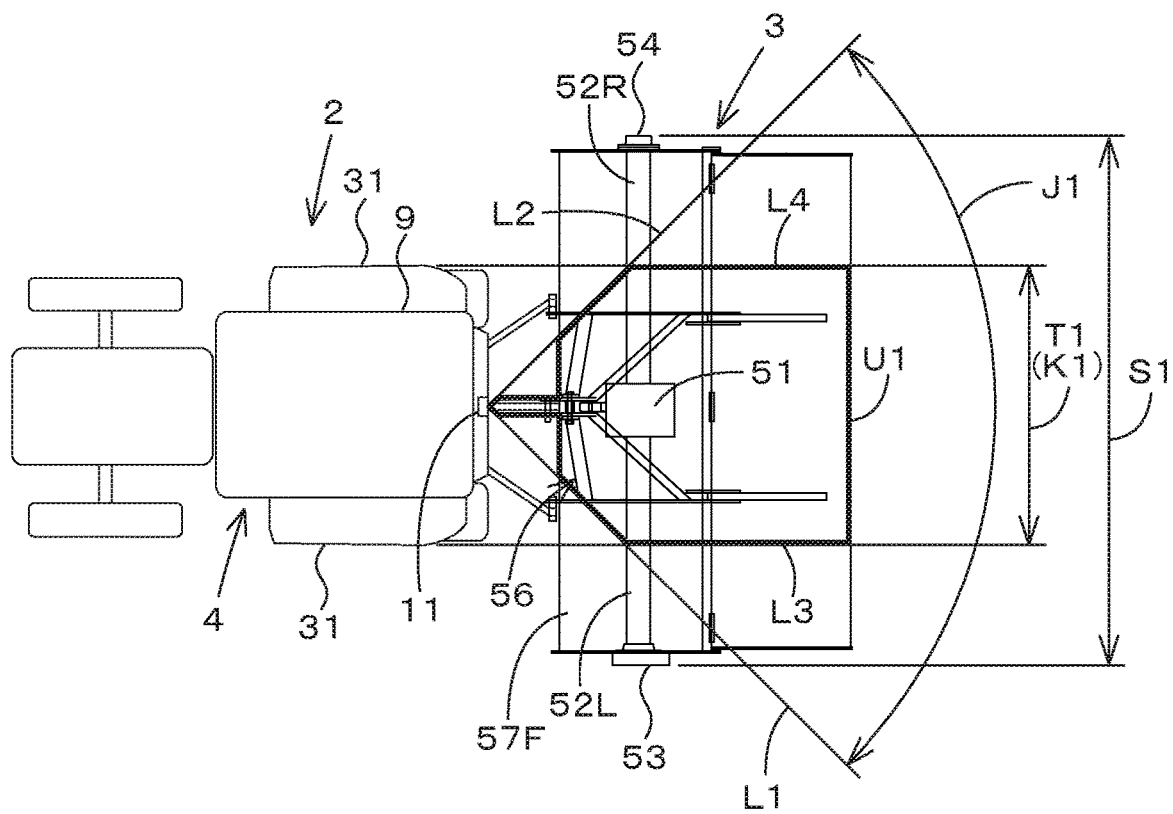
FIG. 4A is a plan view illustrating a positional relation between the working device, a working vehicle, and an RFID reader in a horizontal direction according to the first embodiment.

The installation position in the horizontal direction of the RFID tag 10 is determined by the position in the horizontal direction of the working device 3, the working vehicle 2, and the RFID reader 11. FIG. 4A is a plan view showing the positional relationship in the horizontal direction in the working device 3, the working vehicle 2, and the RFID reader 11.

In FIG. 4A, the RFID reader 11 is provided at the rear portion of the cabin 9. However, the present invention is not limited to this, and the mounting position of the RFID reader 11 is arbitrary.

As shown in FIG. 4A, in a state where the working device 3 is connected to the working vehicle 2, the area spreading toward the working device 3, that is, the frame 50 or the working portion 40 around the RFID reader 11 is referred to as a "horizontal communication area J1". The center of the RFID reader 11 is the center position of the antenna that transmits radio waves.

In other words, in the RFID reader 11, the area of radio waves transmitted from the antenna is set in advance, and is set to a predetermined angle with reference to the antenna. In this embodiment, the opening angle (transmission angle) of the antenna is set to approximately 90 degrees with respect to the antenna.

Thus, the horizontal communication area J1 is the area between one line L1 extending from the center of the antenna toward the working device 3 and the other line L2 extending from the center of the antenna toward the working device 3.

Further, in a state in which the working device 3 is attached to the working vehicle 2, when attention is paid to the working device 3, the area in the horizontal direction where the working vehicle 2 overlaps in the width direction is set as a "horizontal overlapping area K1". First, as shown in FIG. 4A, the horizontal overlapping area K1 is an area of the portion of the device area S1 overlapping with the working vehicle 2 when an interval between a portion (for example, a transmission case 53) protruding from the most one side (left side) and a portion (for example, a side frame 54) protruding from the most other side (right side) in the working device 3 is defined as a "device area S1".

Specifically, in FIG. 4A, the vehicle area T1 that is an area between of the portion of the device area S1 overlapping with the working vehicle 2 when an interval between a line L3 on one side extending from the portion (for example, the fender 31) protruding from the most one side (the left side) of the vehicle body 4 of the working vehicle 2 toward the working device 3 and the line L4 on the other side extending from the portion (for example, the fender 31) protruding from the most other side (the right side) of the vehicle body 4 of the working vehicle 2 toward the working device 3 is smaller than the device area S1, all of the device area T1 is included in the device area S1, and thus the horizontal overlapping area K1 is the same as the vehicle area T1.

The RFID tag 10 is attached to the area (first attachment area) U1 including the horizontal overlapping area K1 in the horizontal communication area J1. That is, the RFID tag 10 is attached to the frame 50 or the working portion 40 included in the first attachment area U1.

In the case of FIG. 4A, for example, the RFID tag 10 is attached to a portion of the mast 56, the gear case 51, the support arm 52L, and the support arm 52R included in the attachment area U1, a part of the upper cover 57F included in the attachment area U1, and the like.

Next, the mounting position in the vertical direction of the RFID tag 10 will be described.

The attachment position in the vertical direction of the RFID tag 10 is determined by the position in the vertical direction of the working device 3, the working vehicle 2, and the RFID reader 11, similarly to the horizontal direction.

Figure 4B:
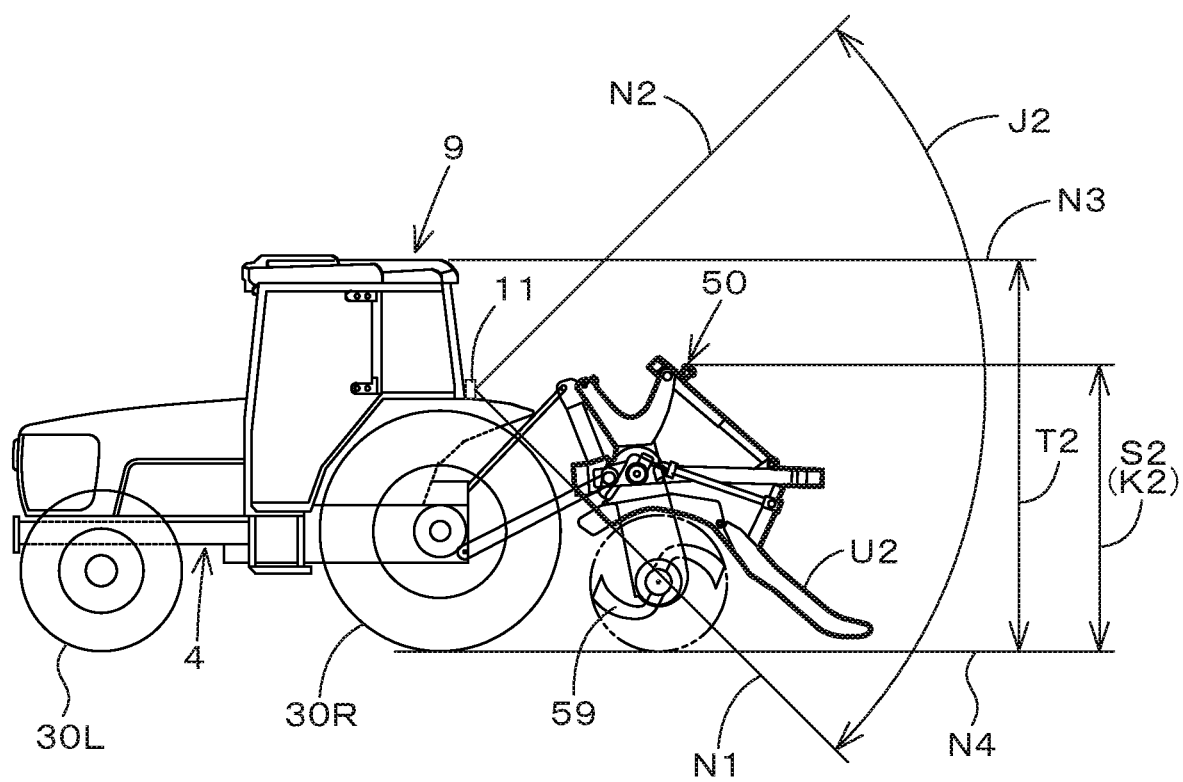
FIG. 4B is a side view illustrating a positional relation between the working device, the working vehicle, and the RFID reader in a vertical direction according to the first embodiment.

FIG. 4B is a side view showing the positional relationship in the vertical direction in the working device 3, the working vehicle 2, and the RFID reader 11. In FIG. 4B, the RFID reader 11 is provided at the rear of the cabin 9. However, the present invention is not limited to this, and the mounting position of the RFID reader 11 is arbitrary.

As shown in FIG. 4B, in a state where the working device 3 is connected to the working vehicle 2, the area spreading toward the working device 3, that is, the frame 50 or the working portion 40, centering on the RFID reader 11 is referred to as a "vertical communication area J2". Similarly to the horizontal direction, the area of the vertical communication area J2 is set to be substantially 90 degrees centering on the antenna.

Thus, the vertical communication area J2 is the area between one line N1 extending from the center of the antenna toward the working device 3 and the other line N2 extending from the center of the antenna toward the working device 3.

Further, in a state in which the working device 3 is attached to the working vehicle 2, when paying attention to the working device 3, the area in the vertical direction where the working vehicle 2 overlaps is defined as a "vertical overlapping area K2". First, as shown in FIG. 4B, between the portion (for example, the mast 56) protruding from the most one (upper side) and the portion protruding from the other (lower side) (for example, the tilling claw 59) in the working device 3 is set as the a "device area S2", the vertical overlapping area K2 is the area of the portion of the device area S2 which overlaps with the working vehicle 2.

In FIG. 4B, the vehicle area T2 that is an interval between a line N3 on one side extending from the portion (for example, the upper end of the cabin 9) protruding from the most one side (the upper side) of the vehicle body 4 of the working vehicle 2 toward the working device 3 and the line N4 on the other side extending from the portion (for example, the lower end of the rear wheel 30R) protruding from the most other side (the lower side) of the vehicle body 4 of the working vehicle 2 toward the working device 3 is larger than the device area S2, all of the device area S2 is included in the vehicle area T2, and thus the vertical overlapping area K2 is the same as the device area S2.

The RFID tag 10 is mounted in the area (second attachment area) U2 that includes the vertical overlap area K2 in the vertical communication area J2. That is, the RFID tag 10 is attached to the frame 50 or the working portion 40 included in the second attachment area U2.

In the case of FIG. 4B, the RFID tag 10 includes the mast 56, the gear case 51, the support arm 52L, the support arm 52R, the part of the upper cover 57F included in the attachment area U2, the part of the rear cover 57R included in the attachment area U2, for example.

As described above, according to the working device 3, the RFID tag 10 is attached to the first attachment area U1 overlapping the horizontal communication area J1 spreading to the frame side around the RFID reader 11 that receives the identifying information of the RFID tag 10, that is, an area overlapped with the vehicle body 4 in the frame 50 in the horizontal direction.

Thus, the RFID tag 10 is located in the first attachment area U1 which is the area overlapping with the working vehicle 2 within the communication area in the horizontal direction of the RFID reader 11, so that the RFID tag 10 transmits to the RFID reader 11, and it is possible to stably transmit the identifying information.

According to the working device 3, the RFID tag 10 is attached to the second attachment area U2 overlapping the vertical communication area J2 spreading to the frame side around the RFID reader 11 that receives the identifying information of the RFID tag 10, that is, an area overlapped with the vehicle body 4 in the frame 50 in the vertical direction.

Thus, the RFID tag 10 is located in the second attachment area U2, which is an area overlapping with the working vehicle 2 within the communication area in the vertical direction of the RFID reader 11, so that the RFID tag 10 can transmits the identifying information to the RFID reader 11 stably.

That is, since the mounting position for mounting the RFID tag 10 on the working device 3 is set based not only on the relationship with the RFID reader 11 but also on the relationship between the working vehicle 2 and the working device 3. Thus, the identifying information from the working device 3 can be obtained even in the case where the working is performed with each of the working vehicle 2 and the working device 3 operated.

In the working device 3, the RFID tag 10 is mounted in an area that satisfies the first attachment area U1 and the second attachment area U2. In addition to this, the communication distance between the RFID tag 10 and the RFID reader 11 is taken into consideration.

For example, when the front-rear width or the body width of the working device 3 is small and the communication distance is sufficiently large with respect to the first attachment area U1 and the second attachment area U2 (The longest distance of the first attachment area U1 and the second attachment area U2<Communication distance), the RFID tag 10 is attached to the first attachment area U1 and the second attachment area U2.

On the other hand, when the front-rear width or the body width of the working device 3 is large and the communication distance is small with respect to the first attachment area U1 and the second attachment area U2 (The longest distance of the first attachment area U1 and the second attachment area U2>Communication distance), the RFID tag 10 is attached to a position that does not exceed the communication distance in the first attachment area U1 and the second attachment area U2.

The mounting position in the horizontal direction of the RFID reader 11 will be described.

The installation position in the horizontal direction of the RFID reader 11 is determined by the position in the horizontal direction of the working device 3, the working vehicle 2, and the RFID tag 10.

Figure 5A:
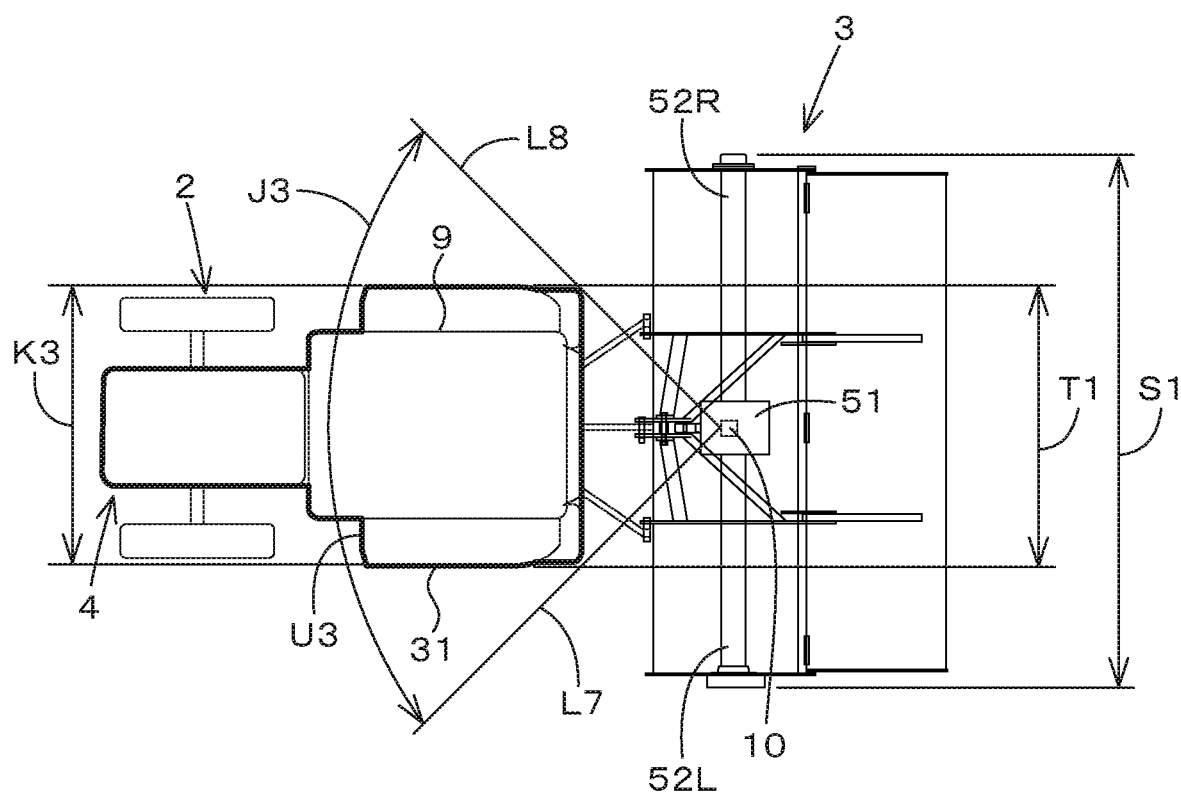
FIG. 5A is a plan view illustrating a positional relation between the working device, the working vehicle, and the RFID reader in the horizontal direction according to the first embodiment.

FIG. 5A is a plan view showing the positional relationship in the horizontal direction in the working device 3, the working vehicle 2, and the RFID tag 10. In FIG. 5A, although the RFID tag 10 is provided in the gear case 51, the present invention is not limited to this, and the mounting position of the RFID tag 10 is arbitrary.

As shown in FIG. 5A, in a state where the working device 3 is connected to the working vehicle 2, the area spreading toward the working vehicle 2, that is, the vehicle body 4 around the RFID tag 10 as the center is set to a "horizontal communication area J3". The center of the RFID tag 10 is the center position of the antenna that transmits radio waves.

In other words, in the RFID tag 10, the area of radio waves transmitted from the antenna is set in advance, and is set to a predetermined angle around the antenna. In this embodiment, the opening angle (transmission angle) of the antenna is set to about 90 degrees with the antenna as the center.

Thus, the horizontal communication area J3 is an area between one line L7 extending from the center of the antenna toward the working device 3 and the other line L8 extending from the center of the antenna toward the working device 3.

Further, in a state in which the working device 3 is attached to the working vehicle 2, when focusing on the working vehicle 2, a horizontal area where the working device 3 overlaps in the width direction is defined as a "horizontal overlapping area K3". The horizontal overlapping area K3 is a part that overlaps the device area S1 of the working device 3 in the vehicle area T1 of the working vehicle 2. Since the device area S1 is larger than the vehicle area T1, the horizontal overlap area K3 is the same as the vehicle area T1.

The RFID reader 11 is attached to an area (third attachment area) U3 including the horizontal overlapping area K3 in the horizontal communication area J3. That is, the RFID reader 11 is attached to the third attachment area U3 including the horizontal overlapping area K3 in the vehicle body 4 or the connecting section 7. In the case of FIG. 5A, the RFID reader 11 can be attached to the cabin 9, the fender 31, and the like.

Next, the mounting position in the vertical direction of the RFID reader 11 will be described.

The mounting position in the vertical direction of the RFID reader 11 is determined by the position in the vertical direction of the working device 3, the working vehicle 2, and the RFID tag 10, similarly to the horizontal direction.

Figure 5B:
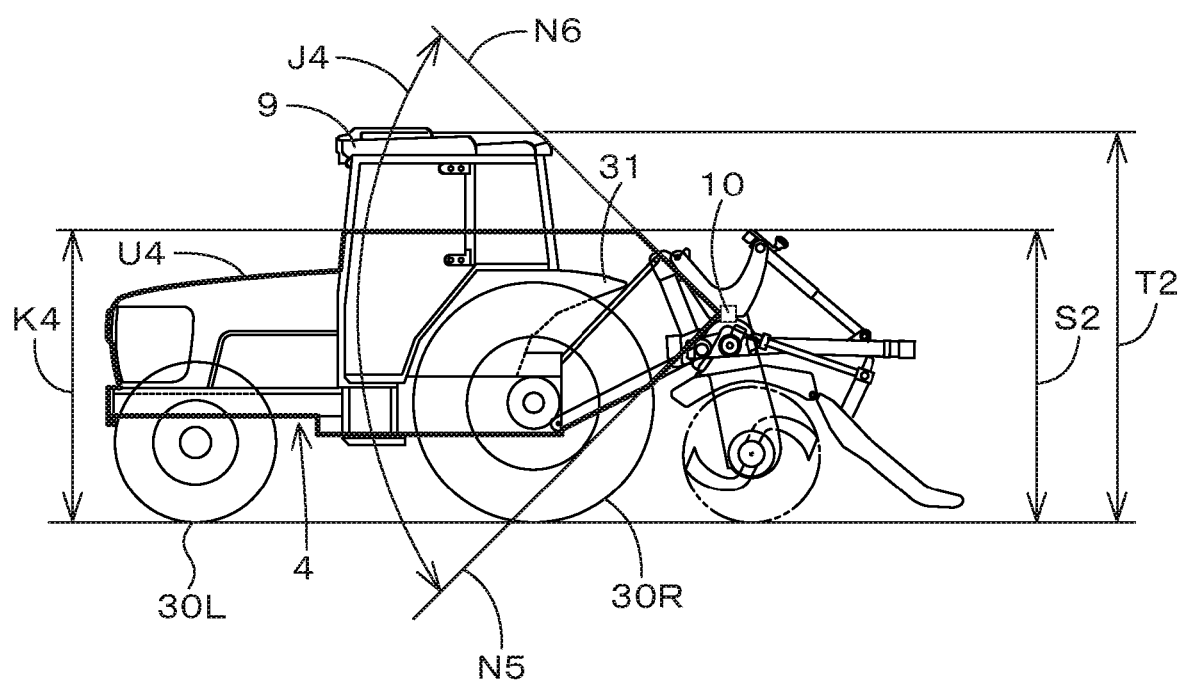
FIG. 5B is a side view illustrating a positional relation between the working device, the working vehicle, and the RFID reader in the vertical direction according to the first embodiment.

FIG. 5B is a side view showing the positional relationship in the vertical direction in the working device 3, the working vehicle 2, and the RFID tag 10. As shown in FIG. 5B, in a state where the working device 3 is connected to the working vehicle 2, an area spreading toward the working vehicle 2, that is, the vehicle body 4 around the RFID tag 10 as the center is defined as a "vertical communication area J4".

The area of the vertical communication area J4 is set substantially at 90 degrees around the antenna like the horizontal direction. Thus, the vertical communication area J4 is an area between one line N5 extending from the center of the antenna toward the working vehicle 2 and the other line N6 extending from the center of the antenna toward the working vehicle 2.

Further, in a state where the working device 3 is attached to the working vehicle 2, when focusing on the working vehicle 2, the area in the vertical direction where the working device 3 overlaps is defined as a "vertical overlapping area K4".

First, as shown in FIG. 5B, the vertical overlapping area K4 overlaps with the device area S2 of the working device 3 in the vehicle area T2 of the working vehicle 2. Since the device area S2 is smaller than the vehicle area T2, the horizontal overlapping area K4 is a part overlapping the device area S2.

The RFID reader 11 is attached to an area (fourth attachment area) U4 that includes the vertical overlap area K4 in the vertical communication area J4. That is, the RFID reader 11 is attached to the fourth attachment area U4 including the horizontal overlapping area K3 in the vehicle body 4 or the connecting section 7. In the case of FIG. 5B, the RFID reader 11 can be attached to a portion of the fender 31 and the cabin 6 included in the attachment area U4.

As described above, according to the working vehicle 2, the RFID reader 11 is attached to the third attachment area that overlaps with the horizontal communication area spreading toward the vehicle body 4 side with respect to the RFID tag 10 as a center, that is, an area overlapping with the working device 3 in the vehicle body 4 in the horizontal direction.

Thus, the RFID reader 11 is located in the third attachment area U3 which is the area overlapping with the working device 3 within the communication area in the horizontal direction of the RFID tag 10, so that the identifying information transmitted from the RFID tag 10 can be stably received by the RFID reader 11.

The RFID reader 11 is mounted in a fourth attachment area U4 overlapping with a vertical communication area spreading toward the vehicle body 4 side with respect to the RFID tag 10 as a center in the area overlapping with the working device 3 in the vehicle body 4 in the vertical direction.

Thus, the RFID reader 11 is located in the fourth attachment area U4, which is the area overlapping with the working device 3 within the communication area in the vertical direction of the RFID tag 10, so that the identifying information transmitted from the RFID tag 10 can be stably received by the RFID reader 11.

That is, since the mounting position at which the RFID reader 11 is attached to the working vehicle 2 is set based not only on the relationship with the RFID tag 10 but also on the relationship between the working vehicle 2 and the working device 3, the working vehicle 2 and the working device 3, it is possible to acquire the identifying information from the working device 3 even in the case where the work is performed while each of them is operated.

In the working vehicle 2, the RFID reader 11 is mounted in the area that satisfies the third attachment area U3 and the fourth attachment area U4, but in addition to this, the communication distance between the RFID tag 10 and the RFID reader 11 is taken into consideration.

For example, when the front-rear width or the body width of the work vehicle 3 is small and the communication distance is sufficiently large with respect to the third attachment area U3 and the fourth attachment area U4 (The longest distance of the third attachment area U3 and the fourth attachment area U4<Communication distance), the RFID reader 11 is attached to the third attachment area U3 and the fourth attachment area U4.

On the other hand, when the front-rear width or the body width of the working vehicle 2 is large and the communication distance is small with respect to the third attachment area U3 and the fourth attachment area U4 (The longest distance of the third attachment area U3 and the fourth attachment area U4>Communication distance), the RFID reader 11 is attached to a position not exceeding the communication distance in the third attachment area U3 and the fourth attachment area U4.

In the embodiment described above, the mounting position of the RFID tag 10 and the mounting position of the RFID reader 11 are separately explained. However, in order to satisfy both of the conditions for mounting the RFID tag 10 and the case of mounting the RFID reader 11, the RFID The tag 10 and the RFID reader 11 may be attached, respectively, or may be attached so as to satisfy only the condition of the RFID tag 10, or may be attached so as to satisfy only the condition of the RFID tag 10.

Further, the RFID tag 10 is attached to the working device 3, and the RFID reader 11 is attached to the working vehicle 2. Thus, the RFID reader 11 can acquire the identifying information of the RFID tag 10 only by bringing the working device 3 corresponding to the work close to the rear portion of the working vehicle 2.

For example, it is possible to easily grasp which working device 3 is mounted on the working vehicle 2 simply by operating the working vehicle 2 and bringing it close to the working device 3 to be mounted. Further, even after the working device 3 is mounted on the working vehicle 2, the operator can confirm the working device 3 attached to the working vehicle 2.

Also, as a matter of course, if the conditions for attaching the RFID tag 10 and the case of mounting the RFID reader 11 are satisfied, the types and shapes of the working vehicle 2 and the working device 3 are not limited. For example, as shown in FIG. 5C and FIG. 5D, it is also applicable to a boom sprayer having a large machine body width of the working device 3.

The working device 3 includes the working portion 40 and the frame 50. The frame 50 is formed in a frame shape by a longitudinal member 50a, a cross member 50b, and the like. The working portion 40 has a tank 40a for storing chemicals and the like and a nozzle 40b attached to a support member projecting leftward or right from the rear portion of the frame 50. The RFID tag 10 is attached to the first attachment area U1 and the second attachment area U2.

Figure 5C:
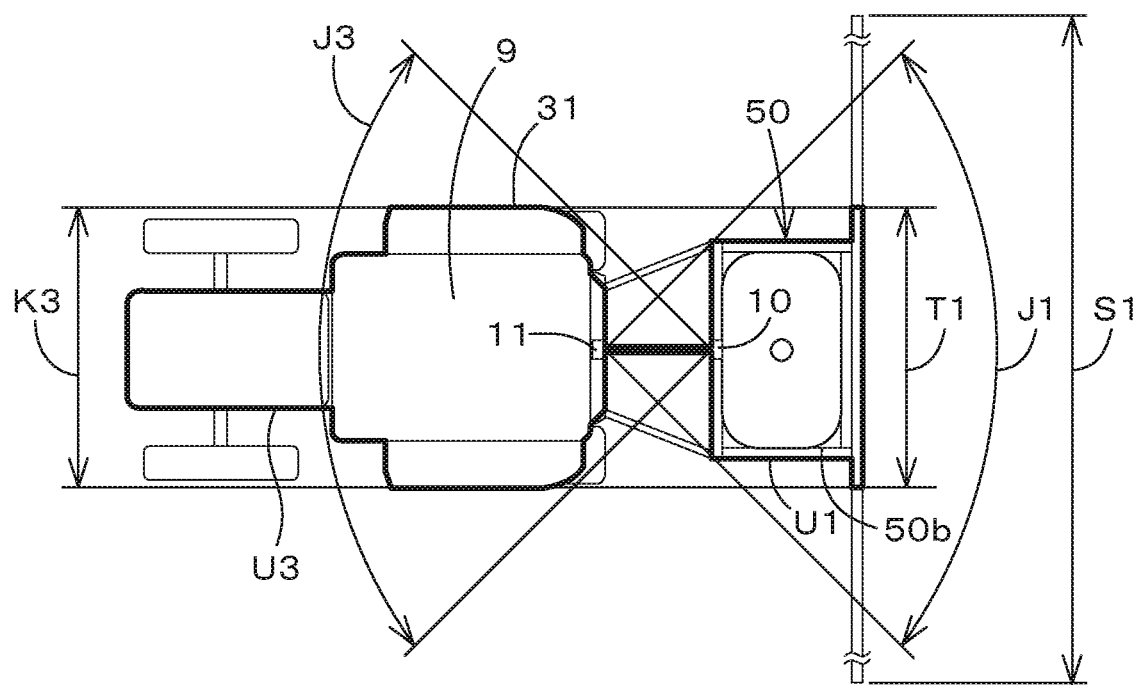
FIG. 5C is a plan view illustrating a positional relation between the working device, the working vehicle, and the RFID reader in the horizontal direction according to the first embodiment.
Figure 5D:
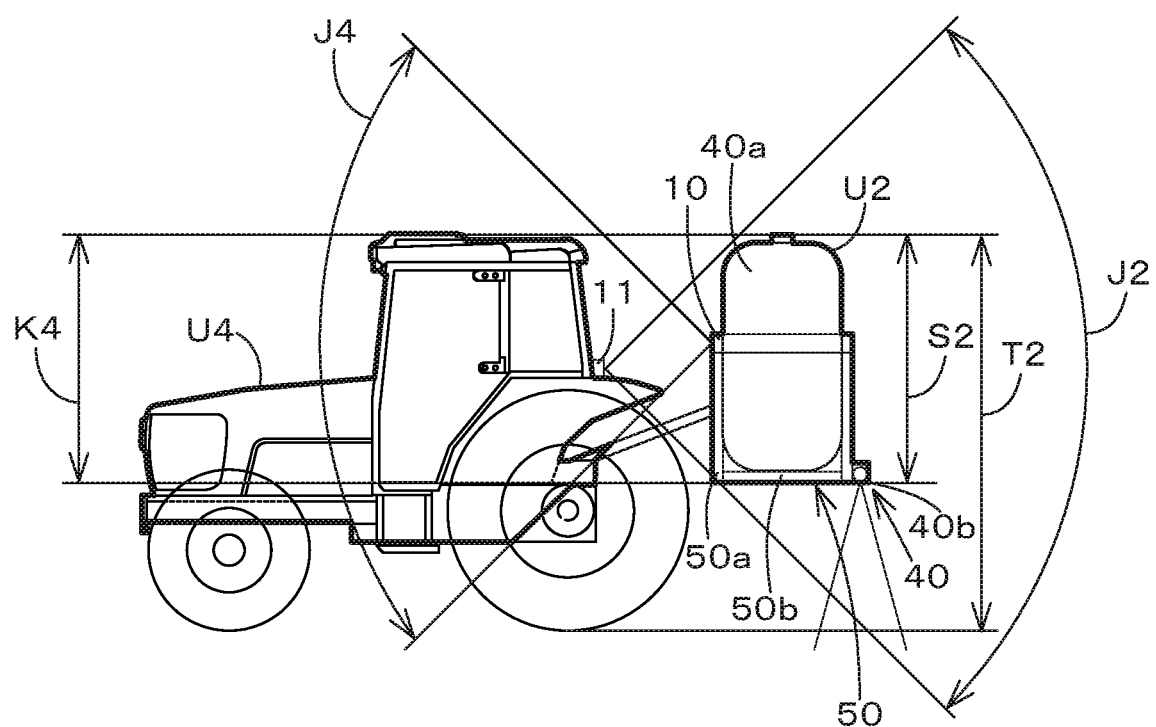
FIG. 5D is a side view illustrating a positional relation between the working device, the working vehicle, and the RFID reader in the vertical direction according to the first embodiment.

In the case of FIG. 5C and FIG. 5D, for example, the RFID tag 10 can be attached to the longitudinal member 50a, the cross member 50b, and the tank 40a. The RFID reader 11 is attached to the third attachment area U3 and the fourth attachment area U4. In the case of FIG. 5C and FIG. 5D, for example, the RFID reader 11 can be attached to the cabin 9 and the fender 31.

FIG. 6 shows the management system of the working device. The management system of the working device in FIG. 6 is a system for managing the working device 3 using the RFID tag 10 and the RFID reader 11.

As shown in FIG. 6, the RFID tag 10 includes a communication part 10a and a storage part 10b. The storage part 10b is composed of a nonvolatile memory or the like, for example, and stores the identifying information of the working device 3.

The communication part 10a is constituted of an antenna or the like, receives radio waves transmitted from the RFID reader 11, and transmits the identifying information stored in the storage part 10b to the RFID reader 11. The distance (output distance) of the identifying information outputted from the communication part 10a varies depending on the output of the radio wave transmitted from the RFID reader 11, but is roughly several tens cm to several tens of meters.

The RFID reader 11 receives the identifying information output from the RFID tag 10. The RFID reader 11 has a communication part 11a. The communication part 11a outputs radio waves and receives the identifying information transmitted from the RFID tag 10. The communication part 11a outputs the data to an in-vehicle network such as CAN, NIN, FNexRay or the like provided in the vehicle body 4.

On the vehicle body 4 of the working vehicle 2, a plurality of devices 12 are mounted separately from the RFID reader 11. This device 12 is a device constituting the working vehicle 2, and is, for example, a detection device 12a, a switch device 12b, a display device 12c, a control device 12d, and a communication device 12e. The detection device 12a is a device for detecting the operation state of the working vehicle 2 and includes an accelerator pedal sensor, a shift lever detection sensor, a crank position sensor, a fuel sensor, a water temperature sensor, an engine revolution sensor, a steering angle sensor, an oil temperature sensor, an axle rotation sensor, a cover sensor (a till depth sensor), a PTO revolution, and the like.

The switch device 12b is a device that performs switching, and is an ignition switch, a parking brake switch, a PTO switch, or the like. The display device 12c is a device for displaying various items related to the working vehicle 2, and is a liquid crystal type display device 12c composed of liquid crystal or the like.

The display device 12c is disposed in front of or in the side of the operator seat 8. The display device 12c displays, for example, the engine revolution speed, the gear shift stage, the water temperature, and the fuel. Further, the display device 12c displays the identifying information received by the RFID reader 11.

The control device 12d is a device that controls the working vehicle 2 and is a CPU or the like. The communication device 12e is a device that communicates with the outside of the working vehicle 2 separately from the RFID reader 11.

The plurality of devices 12 and the RFID reader 11 are connected via an in-vehicle network. In the in-vehicle network, a detection signal (detection value) detected by the detection device 12a, a switch signal indicating switching of the switch device 12b, an operation unit (for example, the prime mover 5, electromagnetic valve, a pump, and the like), the identifying information received by the RFID reader 11, and the like are outputted.

The control device 12d includes a first control device 12d1 and a second control device 12d2. The first control device 12d1 is a device that controls the entire working vehicle 2. The first control device 12d1 is supplied with a detection value detected by the detection device 12a (for example, an operation amount of the accelerator pedal, a shift lever position (gear position) at the time of operation of the shift lever, a revolution speed of the prime mover, a gear position, an oil temperature, a crank position, cam position, and the like] are inputted.

The first control device 12d1 outputs a control command to the second control device 12d2 so that the prime mover 5 reaches a predetermined rotation speed based on the operation amount of the accelerator pedal and controls the transmission device based on the shift lever position (shift control). In addition, the first control device 12d1 controls the ascending and descending of the three-point link mechanism based on the input from the operation member (up/down control).

The second control device 12d2 is a device that mainly controls the prime mover 5. The second control device 12d2 controls the injector, the common rail, the supply pump, and the like based on the input of the operation amount of the accelerator pedal, the crank position, the cam position, and the like.

In the control of the prime mover 5 in the second control device 12d2, for example, the fuel injection amount, the injection timing, and the fuel injection rate are set in the control of the injector, and in the control of the supply pump and the common rail, the fuel injection pressure is set.

The communication device 12e includes a communication part 12e1, a collecting part 12e2, an relating part 12e3, and a storage part 12e4. The communication part 12e1 is a device that performs short distance or long distance communication and can be connected to external devices.

For example, the communication part 12e1 is a communication module that performs wireless communication by the Wi-Fi (Wireless Fidelity (a registered trademark)) of the IEEE 802.11 series which is a communication standard. Note that the communication part 12e1 may be a communication module that performs wireless communication via a cellular phone communication network or a communication module that performs wireless communication via a data communication network.

The collecting part 12e2 sequentially collects operation information [detection signal (detection value), switch signal] of the device when the device is operated (when the prime mover 5 is driven). The collecting part 12e2 collects the operation amount of the accelerator pedal, the gear position, the rotation speed of the prime mover, the steering angle, the vehicle speed, the tilling depth, and the PTO rotation number as device operation information. Note that the operation information acquired by the collecting part 12e2 is not limited to the example described above.

The relating part 12e3 associates the operation information collected by the collecting part 12e2 with the identifying information.

Figure 7:
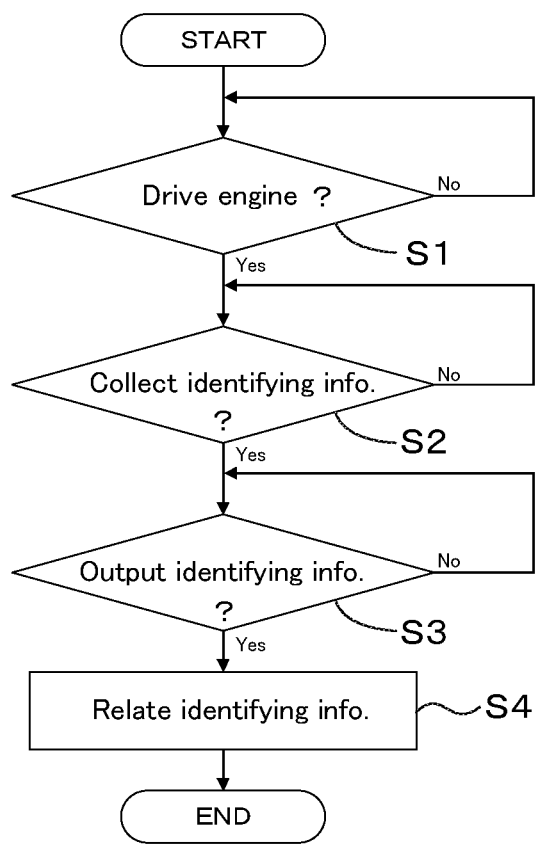
FIG. 7 is a view illustrating an operational flow of a relating part according to the first embodiment.

As shown in FIG. 7, the relating part 12e3 judges whether, for example, the prime mover 5 of the working vehicle 2 is driven or not (step S2).

When the prime mover 5 is being driven (step S2, Yes), the relating part 12e3 determines whether collection of the operation information by the collecting part 12e2 has been started (step S2, Yes).

When collection of operation information by the collecting part 12e2 is started (step S2, Yes), the relating part 12e3 determines whether identifying information is output from the RFID reader 11 to the in-vehicle network (step S3).

As shown in FIG. 7, when the identifying information is outputted to the in-vehicle network (step S3, Yes), the relating part 12e3 associates the identifying information with the operation information collected by the collecting part 12e2 (step S4).

The associated operation information and identifying information are stored in the storage part 12e4 composed of a nonvolatile memory or the like as a working record. The operation information and the identifying information associated by the relating part 12e3 are displayed on the display device 12c.

Note that the communication part 12e1 of the communication device 12e may transmit the operation information and the identifying information to the outside, and the mobile terminal 13 may display the operation information and the identifying information transmitted from the communication part 12e1.

Specifically, the mobile terminal 13 is composed of, for example, a smartphone (a multi-function mobile phone) and a tablet PC having a relatively high calculation capability. The mobile terminal 13 includes a communication part 13a that acquires information output from the communication part 12e1 of the communication device 12e, and the display part 13b. The communication part 13a is a communication module that performs wireless communication using IEEE 802.11 series of communication standards such as the Wi-Fi (Wireless Fidelity (a registered trademark)).

Note that the communication part 13a may be a communication module that performs wireless communication via a cellular phone communication network or a communication module that performs wireless communication via a data communication network. The display part 13b is a liquid crystal panel or the like, and can display information received by the communication part 13a, for example, operation information and identifying information.

According to the above, the RFID tag 10 is attached to the working device 3, and the RFID reader 11 is attached to the working vehicle 2. Thus, the RFID reader 11 can acquire the identifying information of the RFID tag 10 only by bringing the working device 3 corresponding to the work close to the rear portion of the working vehicle 2.

For example, the RFID reader 11 can automatically acquire the identifying information by operating the working vehicle 2 and bringing the working vehicle 2 closer to the working device 3 to be worn by the worker. By displaying the identifying information acquired by the RFID reader 11 on the display device 12c, the mobile terminal 13 or the like, it is possible to easily grasp which working device 3 is attached to the working vehicle 2. Further, even after the working device 3 is mounted on the working vehicle 2, the worker can confirm the working device 3 attached to the working vehicle 2.

Figure 8:
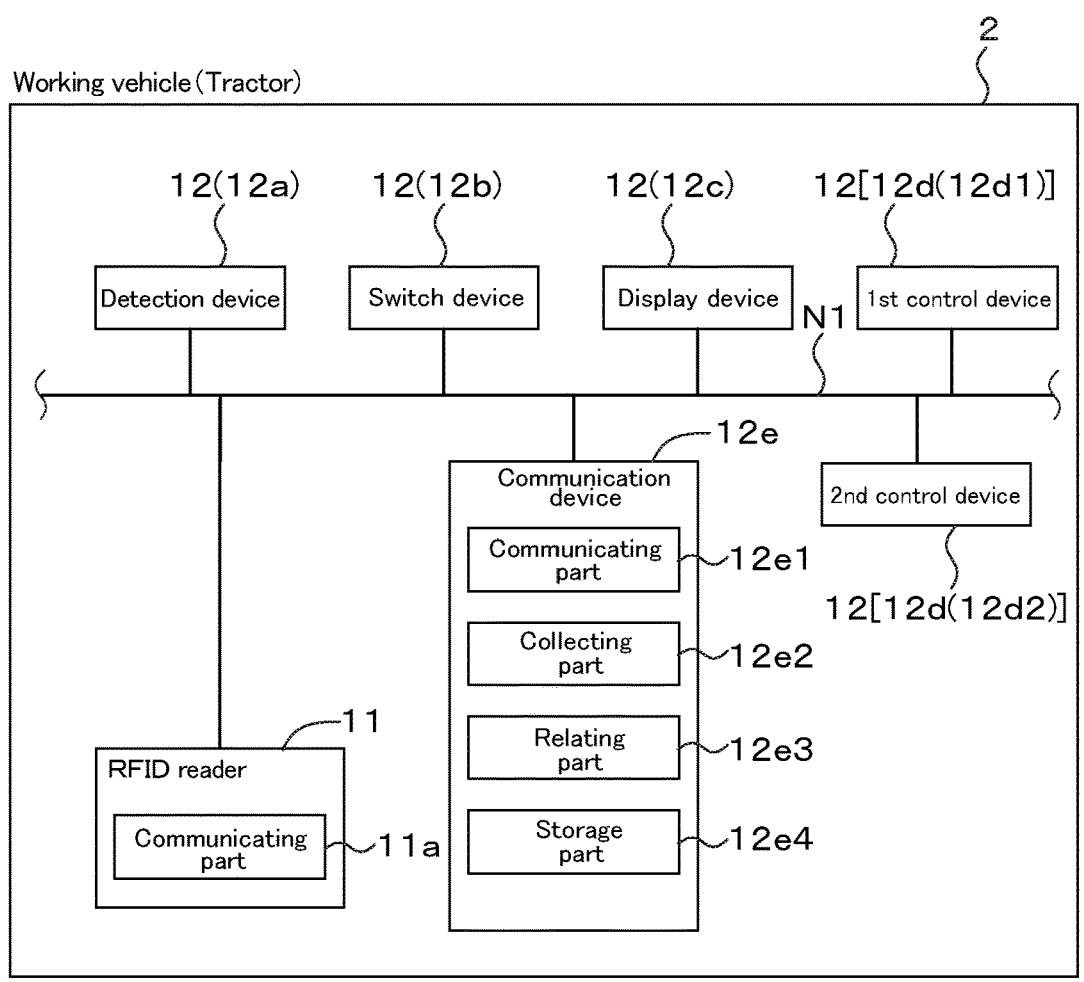
FIG. 8 is a view illustrating a modified example of a management system of the working device according to the first embodiment.
Figure 8:
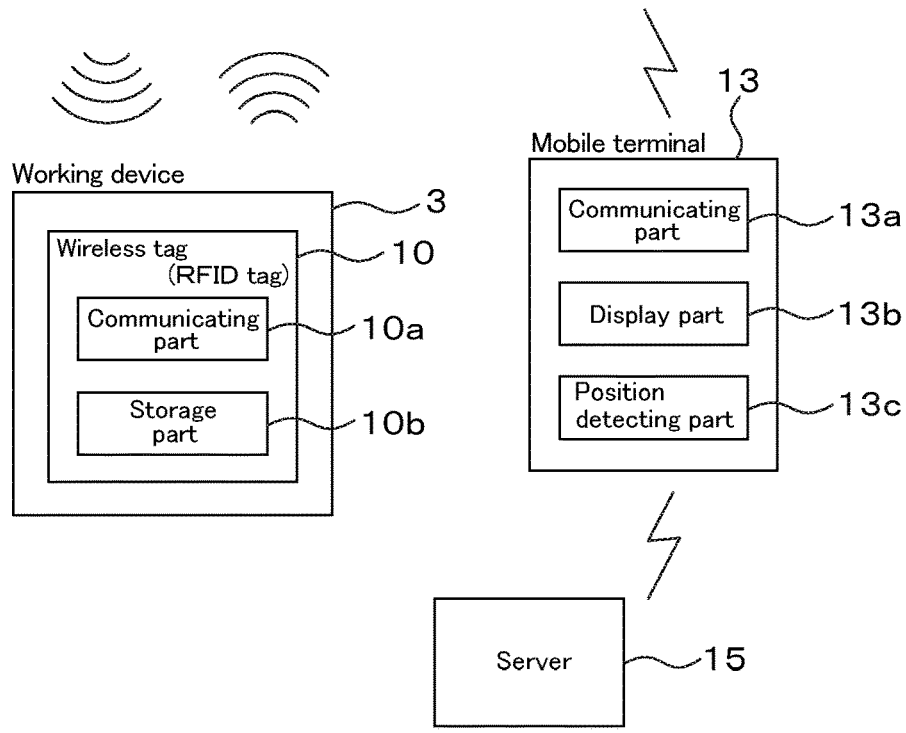

FIG. 8 shows a modified example of the management system of the working device.

The management system of the working device includes a server 15 and a mobile terminal 13. The mobile terminal 13 includes a communication part 13a, a display part 13b, and a position detection part 13c. The communication part 13a is connectable to the communication device 12e and the server 15. The display part 13b is the same as the above-described embodiment. The position detection part 13c detects a position (for example, longitude, latitude) based on a signal of a positioning satellite such as GPS.

According to such the mobile terminal 13, if the mobile terminal 13 is connected to the communication device 12e, it is possible for the communication part 13a to acquire the identifying information. The communication part 13a of the mobile terminal 13 transmits the acquired identifying information to the server 15 together with the position (hereinafter referred to as position information) detected by the position detection part 13c. Further, the communication part 13a may transmit the operation information to the server 15 in addition to the identifying information and the position information.

The server 15 can acquire various information transmitted from the mobile terminal 13. The server 15 stores various pieces of information received from the mobile terminal 13 as work results. For example, as shown in FIG. 9A, when receiving the identifying information and the position information transmitted from the mobile terminal 13, the server 15 saves the identifying information and the position information as a work record.

In this case, it is possible to reliably ascertain from which position the working device 3 indicated by the identifying information has performed work in the field. In particular, the identifying information is "Output from the RFID tag 10 of the working device 3"→"Received by the RFID reader 11 of the working vehicle 2 to which the working device 3 is attached"→"Output from the RFID reader 11"→"Received by the communication device 12e"→"Output from the communication device 12e"→"Received by the server via the mobile terminal 13".

Thus, it is possible to prove that the predetermined working device 3 has been towed and worked by the predetermined working vehicle 2 with the fact that the identifying information is stored in the server, thereby improving the reliability of the work record.

Alternatively, as shown in FIG. 9B, when the server receives the operation information, the identifying information, and the position information, the server stores the operation information, the identifying information, and the position information as a work record. In this case, it is possible to reliably ascertain which work has been performed in which field in the working device 3 indicated by the identifying information and the working vehicle 2 towing the working device 3.

In addition to the identifying information, the operation information also reaches the server via the communication device 12e mounted on the predetermined working vehicle 2. Thus, it is possible to prove that the predetermined working vehicle 2 has towed and worked by the predetermined working vehicle 2 with the fact that the identifying information and the operation information corresponding to the identifying information are stored in the server. Thus, it is possible to improve the reliability of the work record.

In FIG. 8, the position detection part 13c is provided in the mobile terminal 13. Alternatively, a configuration similar to that of the position detection part 13c may be provided in the communication device 12e. In this case, the communication device 12e also transmits the position information when transmitting the identifying information and the operation information to the mobile terminal 13. Further, the communication device 12e may transmit the identifying information, the operation information, and the position information to the server 15 through the cellular phone communication network or the data communication network.

Further, if the identifying information received by the RFID reader 11 and the position information detected by the position detection part 13c are stored in any one of the communication device 12e, the mobile terminal 13, and the server 15, the RFID reader 11 receives the identifying information can grasp the position where the RFID reader fails to receive the identifying information, that is, the position where the working device 3 is separated from the working vehicle 2.

Second Embodiment

Figure 10:
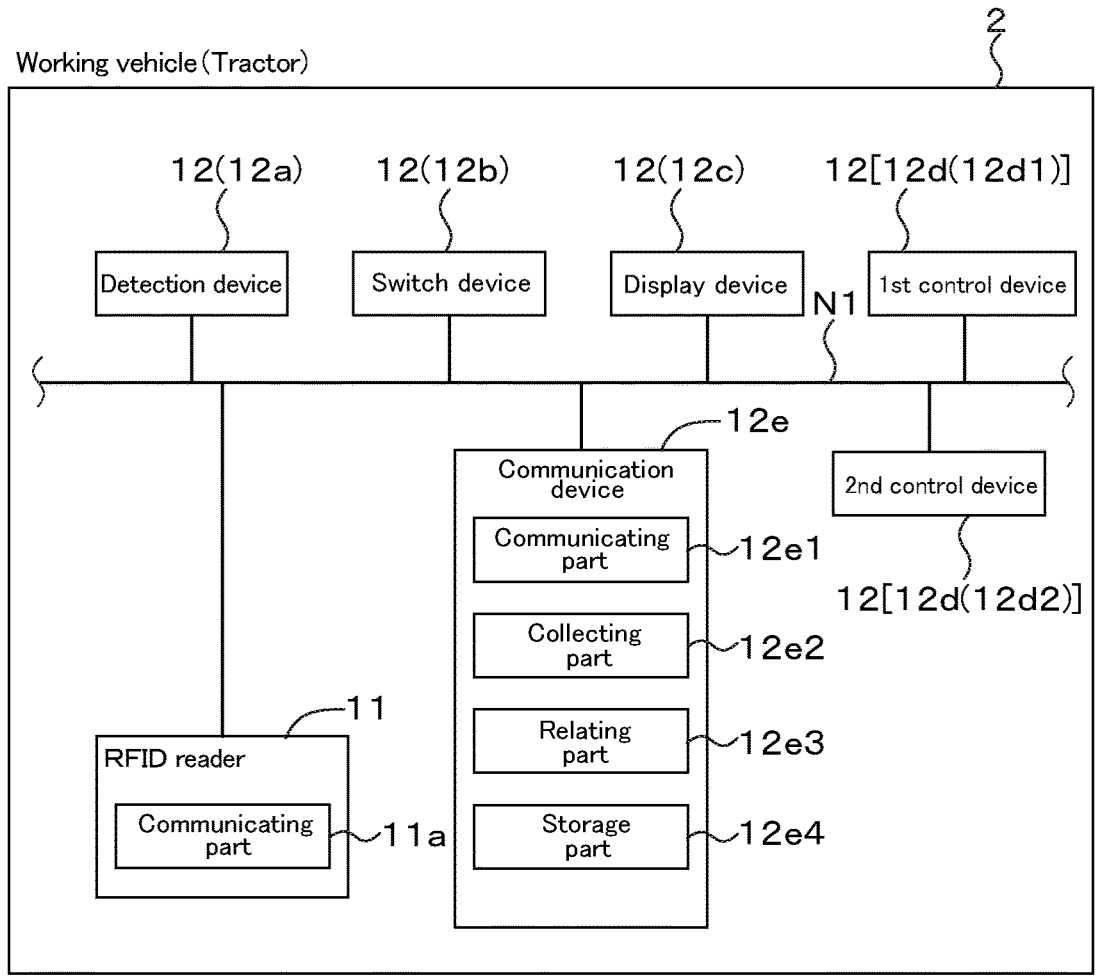
FIG. 10 is a view illustrating a management system for a working device according to a second embodiment of the present invention.

FIG. 10 shows a management system of the working device according to the second embodiment. The management system of the working device will not be described in the same way as in the first embodiment. In the management system of the working device of the second embodiment, the mounting positions of the RFID tag 10 and the RFID reader 11 shown in the first embodiment are not limited.

As shown in FIG. 10, the management system of the working device includes an RFID tag 10 provided in the working device 3 and a code providing part 16. Like the RFID tag 10 described in the first embodiment, the RFID tag 10 has a communication part 10a and a storage part 10b.

In this embodiment, the code providing part 16 is separated from the RFID tag 10 in a graphic form, and is, for example, a bar code or two-dimensional code in which identifying information is shown by a figure such as a line. The code providing part 16 is a sheet on which a QR code (a registered trademark) is printed. The code providing part 16 may be any anything as long as it shows the identifying information of the RFID tag 10.

Figure 11A:
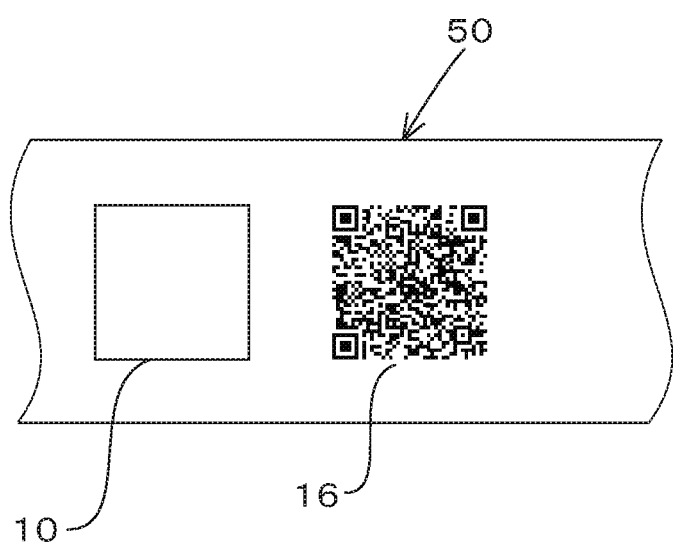
FIG. 11A is a view illustrating an example in which a code providing part and an RFID tag are attached to the working device according to the second embodiment.

As shown in FIG. 11A, the code providing part 16 is attached to the working device 3. Specifically, the code providing part 16 is installed in the working device 3 in the working portion 40 or the frame 50 near the RFID tag 10. Unlike the RFID tag 10, the code providing part 16 has no restriction on the mounting position and may be mounted anywhere.

And, the identifying information of the RFID tag 10 and the code providing part 16 attached to the working device 3 are the same. That is, in the predetermined working device 3, the identifying information indicated by the code providing part 16 and the identifying information stored in the RFID tag 10 are the same.

Figure 11B:
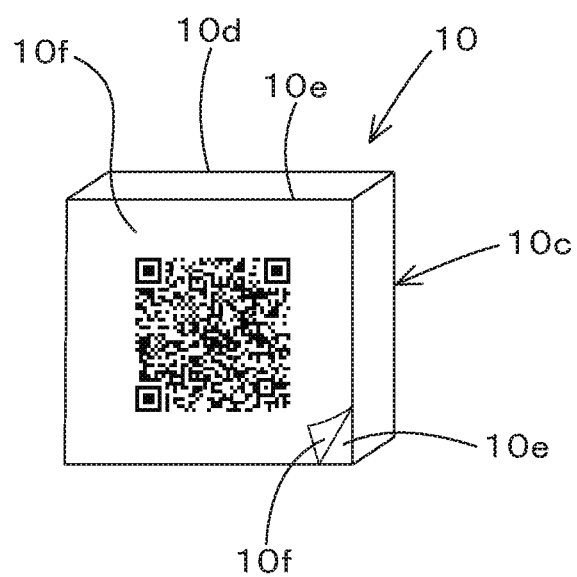
FIG. 11B is a view illustrating an RFID with code constituted by integrating the RFID tag and the code providing part according to the second embodiment.

As shown in FIG. 11B, a code-attached RFID tag in which the RFID tag 10 and the code providing part 16 are integrated may be attached to the working device 3. Specifically, the code-attached RFID tag 10 includes a housing 10c that stores the communication part 10a and the storage part 10b, and a sheet-like code providing part 16 that is attached to the housing 10c.

The housing 10c has a mounting surface 10d to be attached to the working device 3 and a bonding surface 10e to which the code providing part 16 is attached. The code providing part 16 is attached to the attachment surface 10e of the housing 10c so that a figure indicating the code can be seen, and a transparent or translucent protective film 10f for protecting the figure is pasted on the code providing part 16.

In FIG. 11B, the protective film 10f on the lower right side of the casing 10c is peeled off from the sticking face 10e, but for the sake of convenience of explanation, it is intended to make it easy to understand the sticking face 10e and the protection film 10f. Actually, the protective film 10f on the lower right side of the casing 10c is also attached to the sticking surface 10e.

The management system of the working device includes a reading part 17 and a registration part 18. The reading part 17 is a device for reading a figure of the code providing part 16, and is an imaging device such as a camera for imaging a figure. The registration part 18 decodes the figure read by the reading part 17 to the identifying information and registers the working device 3 in association with the decoded identifying information.

The registration part 18 is mainly composed of a program stored in a computer (a server, a mobile terminal, a personal computer). As shown in FIG. 10, the reading part 17 and the registration part 18 are provided in the mobile terminal 13 in the present embodiment.

When the program (application software) for registering the RFID tag 10 or the like is activated in the mobile terminal 13, the reading part 17 is activated.

When the reading part 17 of the mobile terminal 13 is activated and the figure is read by the reading part 17, the registration part 18 registers the pattern on the graphic of the code providing part 16 read by the reading part 17 as information indicating the identification information. In this manner, the identification information is decoded. The identification information decoded by the registration part 18 is displayed on the display part 13b of the mobile terminal 13.

Figure 12A:
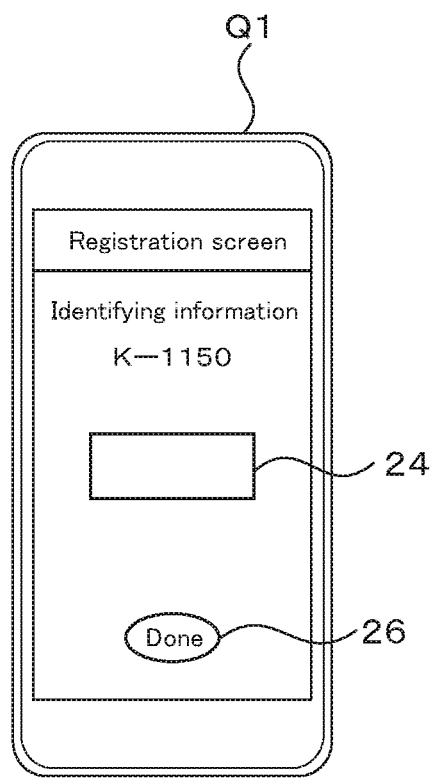
FIG. 12A is a view illustrating a first registration screen according to the second embodiment.

FIG. 12A shows a registration screen Q1 displaying the identifying information on the display part of the mobile terminal 13. On the registration screen Q1, a first input part 24 capable of inputting information (device information) on the working device 3 is displayed.

Various device information (first information) can be input to the first input part 24, and a user (worker) or the like possessing the working device 3 can input, to the first input part 24, the device information such as the machine type, a model, a model number and the like of the working device 3, using an interface or the like.

When the button (completion button) 26 shown on the registration screen is selected after the device information is input to the first input part 24, the registration part 18 registers the identifying information displayed on the registration screen Q1 and the identifying information and registers the device information input to the input part 24 in associated with each other.

That is, the registration part 18 associates the identifying information displayed on the registration screen Q1 with the machine type, the model, the model number, and the like of the working device 3, and stores them in the storage part 12e4 of the mobile terminal 13.

Thus, in the managing system of the working device, only by reading the figure of the code providing part 16 in the reading part 17 after entering the device information on the registration screen Q1 displayed on the mobile terminal 13, the operator easily associate the identifying information of the RFID tag 10 the working device 3 and stores them in the mobile terminal 13.

For example, in a case where the identifying information of the RFID tag 10 and the code providing part 16 is the serial number of the working device 3 and the worker cannot grasp immediately the machine type, the model, the model number or the like, even if the operator sees the serial number. By inputting the machine type, the model, the model number and the like to the first input part 24, it is possible to associate the serial number with the machine type, the model, the model number or the like and to store them in the mobile terminal 13.

In the mobile terminal 13, when a serial number is associated with the machine type, the model, the model number or the like, the identifying information received by the RFID reader 11 is displayed on the mobile terminal 13 instead of the serial number, the machine type, the model, the model number or the like.

Further, in an operation of attaching the RFID tag 10 to the working device 3, when entering the machine type, the model, the model number or the like to the registration screen Q1 after imaging the code providing part 16, the RFID tag 10 attached and the working device 3 to which the RFID tag 10 is attached can be certainly correlated, and it can be very easy to perform the initial setting on the RFID tag 10.

It should be noted not only the working device 3 but also an operator may be registered, that is, linked with the identifying information of the RFID tag 10.

Figure 12B:
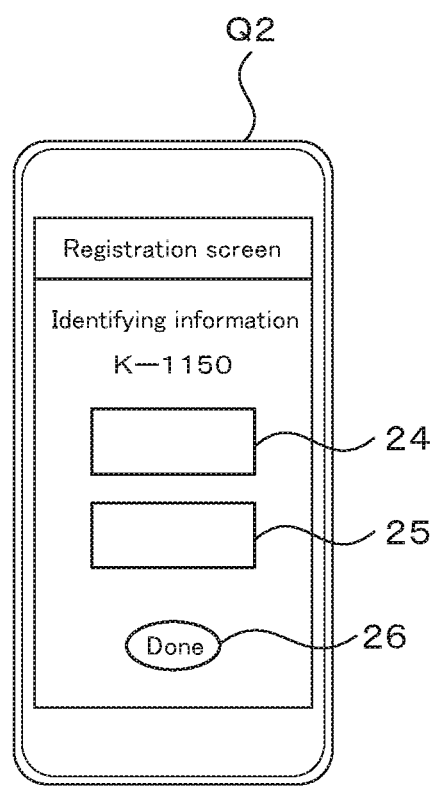
FIG. 12B is a view illustrating a second registration screen according to the second embodiment.

FIG. 12B shows the registration screen Q2 displaying the identifying information on the display part 13b of the mobile terminal 13. In the registration screen Q2, not only the first input part 24 but also a second input part 25 capable of inputting information (second information) on the user (worker) are displayed. Various pieces of user information can be input to the second input part 25, and the user or the like inputs, for example, the name of the user to the second input part 25 using an interface or the like.

When the user is an individual, the user's address, contact address, sex, age, and the like may be inputted to the second input part 25 as the user information. When the user is a company, the name of the company that owns the working device 3, the department to which the working machine 3 belongs, and the like may be inputted as the user information.

After the device information is input to the first input part 24 of the display part 13b of the mobile terminal 13 and the user information is input to the second input part 25, when the completion button 26 shown on the registration screen is selected, the registration part 18 relates the identifying information displayed on the registration screen Q2, the device information inputted to the first input part 24, and the user information inputted to the second input part 25 to each other and registers them.

That is, the registration part 18 associates the identifying information displayed on the registration screen Q2 with the machine type, the model number, the name, and the like of the working device 3, and stores them in the storage part 12e4 of the mobile terminal 13.

Thus, by merely entering the device information and the user information to the registration screen Q2, the worker can easily associate the identifying information of the RFID tag 10 with the working device 3 and the user.

For example, when an operator enters the user information to the registration screen Q2 at the time of attaching the RFID tag 10, the operator can definitely associate the installed RFID tag 10 and the user using the working device 3 on the spot, and it can be very easy to perform the initial setting on the RFID tag 10.

Note that the reading part (an imaging device) 17 and the mobile terminal 13 may be configured separately, and the image read by the reading part 17 or the identifying information after restoration may be transmitted from the reading part 17 to the mobile terminal 13. In this case, the registration part 18 registers the decoded identifying information in association with the working device 3.

Further, according to the above-described embodiment, since the RFID tag 10 and the code providing part 16 or the code-attached RFID tag 10 are provided in the working device 3, the identifying information can be read by the code providing part 16 and used as a backup of the identifying information even when the RFID tag 10 cannot transmit the identifying information for some reason.

Third Embodiment

Figure 13:
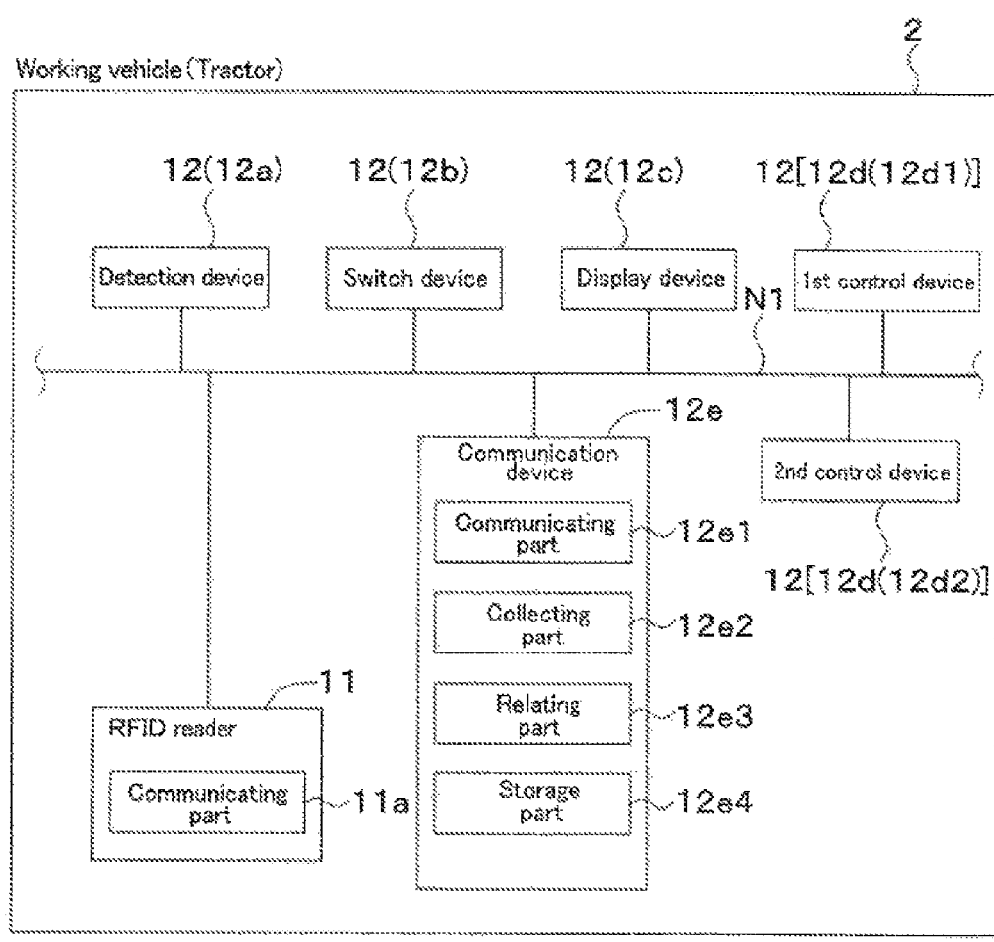
FIG. 13 is a view illustrating a management system for a working device according to a third embodiment of the present invention.
Figure 13:
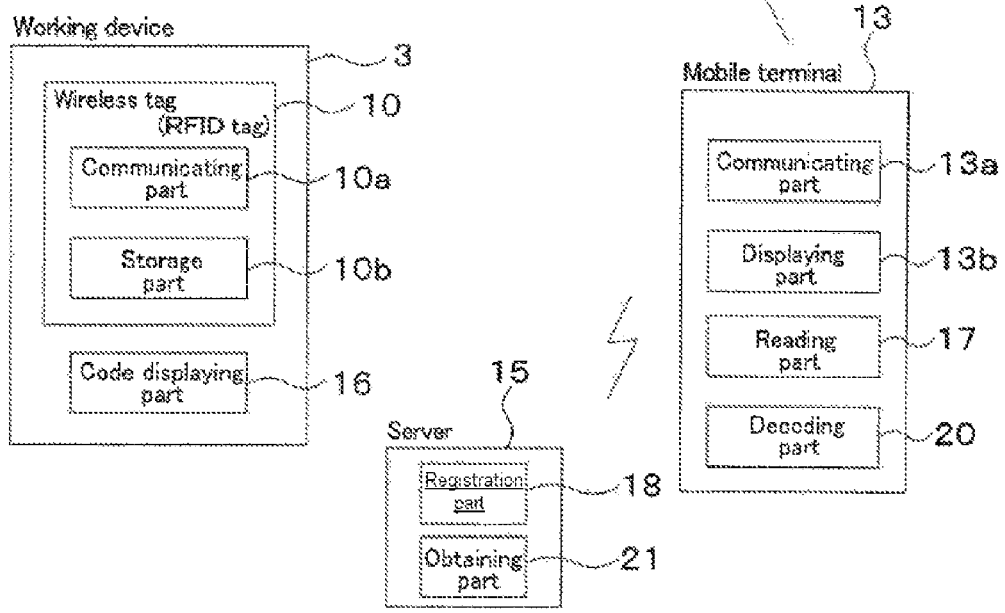

FIG. 13 shows a management system of the working device according to the third embodiment. The third embodiment is a modification of the management system of the working device shown in the second embodiment. Descriptions of parts similar to those of the first embodiment and the second embodiment will be omitted.

As shown in FIG. 13, the management system of the working device includes an RFID tag 10 provided in the working device 3 and a code providing part 16. Like the RFID tag 10 described in the first embodiment, the RFID tag 10 has a communication part 10a and a storage part 10b.

The code providing part 16 is similar to the code providing part 16 shown in the second embodiment. Incidentally, also in the third embodiment, the code-attached RFID tag may be attached to the working device 3.

The mobile terminal 13 includes a communication part 13a, a display part 13b, a reading part 17, and a decoding part 20. The decoding part 20 is constituted of a program or the like stored in the mobile terminal 13. When the program (application software) for registering the RFID tag 10 and the like is activated in the mobile terminal 13, the reading part 17 is activated.

When a figure is read by the reading part 17 of the mobile terminal 13, the decoding part 20 converts the pattern on the graphic of the code providing part 16 read by the reading part 17 into information indicating the identifying information, whereby identifying the information thereof.

When a program (application software) for registering the RFID tag 10 and the like is activated, a registration screen Q1 or a registration screen Q2 is displayed on the display part 13b of the mobile terminal 13. In the registration screen Q1 and the registration screen Q2, the identifying information decoded by the decoding part 20 is displayed.

When the device information is inputted to the registration screen Q1 and the completion button 26 is selected, the communication part 13a transmits the identifying information and the device information to the server 15, the device information being entered to the first input part 24 of the registration screen Q1 and the device information being displayed on the registration screen Q1. When the device information and the user information are inputted to the registration screen Q2 and the completion button 26 is selected, the communication part 13a transmits the identifying information, the device information, and the user information to the server 15, the device information being entered to the first input part 24 of the registration screen Q2, the device information being inputted to the registration screen Q2, and the user information being entered to the second input part 25 of the registration screen Q2.

The server 15 has a registration part 18 and an obtaining part 21. The registration part 18 and the obtaining part 21 are composed of programs and the like stored in the server 15. When the server 15 receives the identifying information and the device information transmitted from the mobile terminal 13, the obtaining part 21 acquires the received identifying information and device information.

The registration part 18 associates the identifying information acquired by the obtaining part 21 with the device information and stores them in the storage part 12e4. Thus, in the management system of the working device, after reading the figure of the code providing part 16 by the reading part 17, the device information is input to the registration screen Q1 displayed on the display part 13b of the mobile terminal 13 and transmitted to the server 15. Thus, the worker can easily associate the identifying information of the RFID tag 10 with the working device 3 and register them in the server 15.

Now, when the information transmitted from the mobile terminal 13 includes the user information in addition to the device information and the identifying information, the obtaining part 21 of the server 15 acquires the device information, the user information, and the identifying information. The registration part 18 associates the identifying information acquired by the obtaining part 21 with the device information and the user information, and stores them in the storage part 22.

Thus, in the managing system of the working device, after reading the figure of the code providing part 16 by the reading part 17, the device information and the user information are inputted to the registration screen Q2 displayed on the display part 13b of the mobile terminal 13, and the server 15. Thus, the worker can easily associate the identifying information of the RFID tag 10 with the working device 3 and the user, and register them to the server 15.

In this manner, as described above, when storing the work record, the work record and the user can be associated with each other using the identifying information in the server 15, and the work performed by the user can be grasped.

Further, when the machine type, the model, the model number, and the like are not included in the identifying information of the RFID tag 10, it is possible to correlate the machine type, the model, the model number, and the like of the working device 3 with the work record. Thus, it is possible to grasp which working device 3 provides the work record.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A management system for a working device, comprising:
a wireless tag reader provided on a working vehicle detachably coupled to the working device;
a communication device connected to the wireless tag reader via an in-vehicle network of the working vehicle; and
a mobile terminal configured to wirelessly communicate with the communication device,
wherein the working device includes a storage part to store identifying information of the working device, a communicating part to transmit the identifying information, and a code providing part to provide a graphic containing the same identifying information as one stored in the storage part, and
wherein the mobile terminal is configured to receive the identifying information stored in the storage part through the communicating part, the wireless tag reader, and the communication device, and to read the identifying information through the graphic provided on the code providing part.

2. The management system according to claim 1, wherein the code providing part is attached to a housing to store the communication part and the storage part.

3. The management system according to claim 1, wherein the mobile terminal is configured to relate the identifying information to the working device, and to register the working device with the identifying information.

4. The management system according to claim 3, wherein the mobile terminal has a displaying part to display the identifying information, and a first inputting part to which first information relating to the working device is input, and
wherein the mobile terminal is configured to relate the first information to the identifying information, and to register the first information with the identifying information.

5. The management system according to claim 4, wherein the mobile terminal has a second inputting part to which information of a user owning the working device is input, and
wherein the mobile terminal is configured to relate the first information and the second information to the identifying information, and to register the first information and the second information with the identifying information.

6. The management system according to claim 1, comprising:
a server configured to communicate with the mobile terminal,
wherein the server is configured to relate the identifying information to the working device, and to register the working device with the identifying information.

7. The management system according to claim 6, wherein the mobile terminal has a displaying part to display the identifying information, and a first inputting part to which first information relating to the working device is input, and
wherein the server is configured to relate the first information to the identifying information, and to register the first information with the identifying information.

8. The management system according to claim 7, wherein the mobile terminal has a second inputting part to which information of a user owning the working device is input, and
wherein the server is configured to relate the first information and the second information to the identifying information, and to register the first information and the second information with the identifying information.

9. The management system according to claim 1, wherein a transparent or translucent protective film is attached on the code providing part for protecting the graphic thereof.

* * * * *